Jan. 3, 1928.
J. W. CHANNELL
WIRE SPLICING MACHINE
Filed Jan. 4, 1924
1,654,788
3 Sheets-Sheet 1
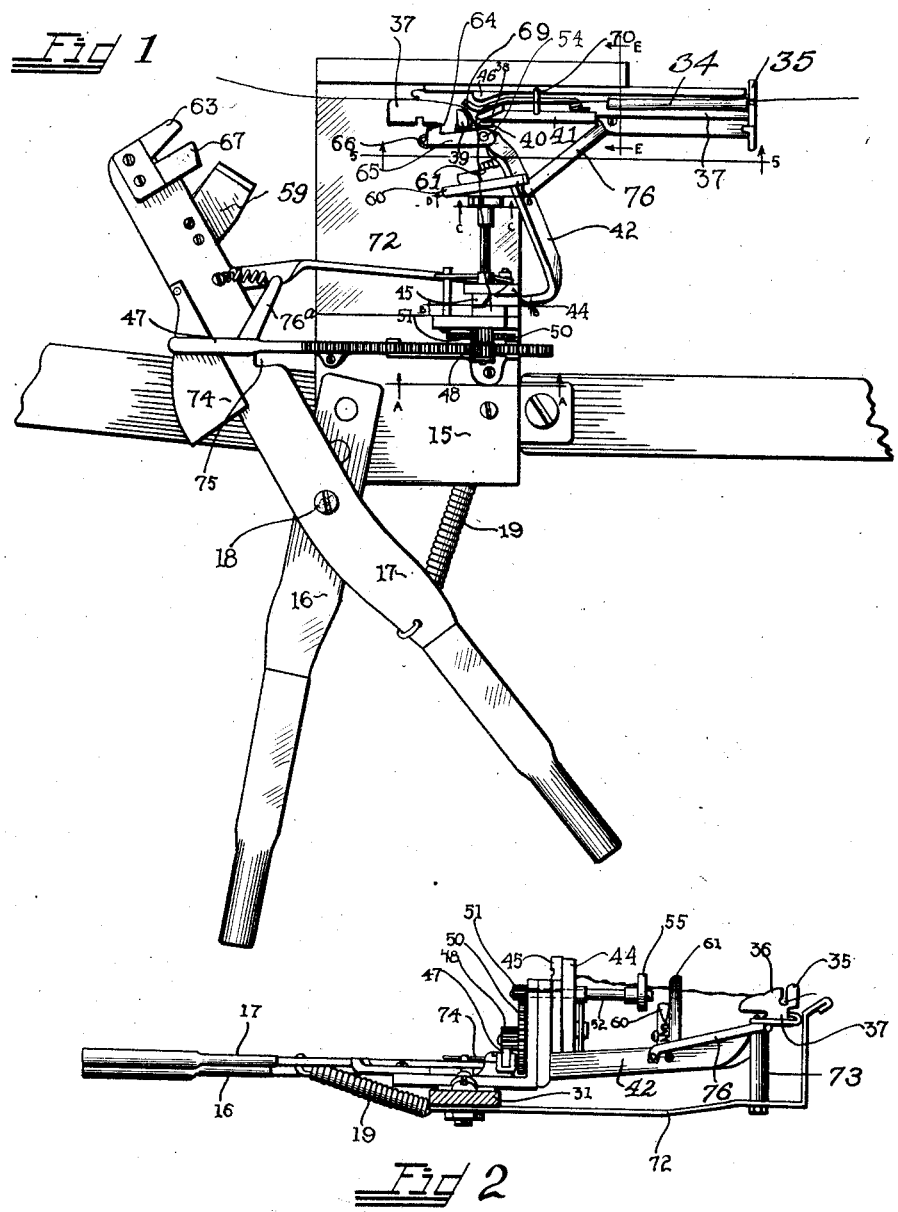
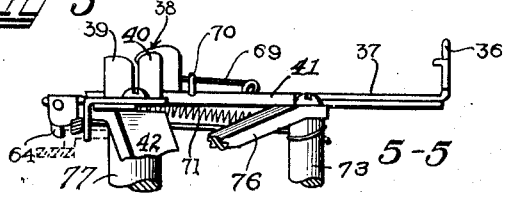
INVENTOR.
James W. Channell
BY
ATTORNEY.

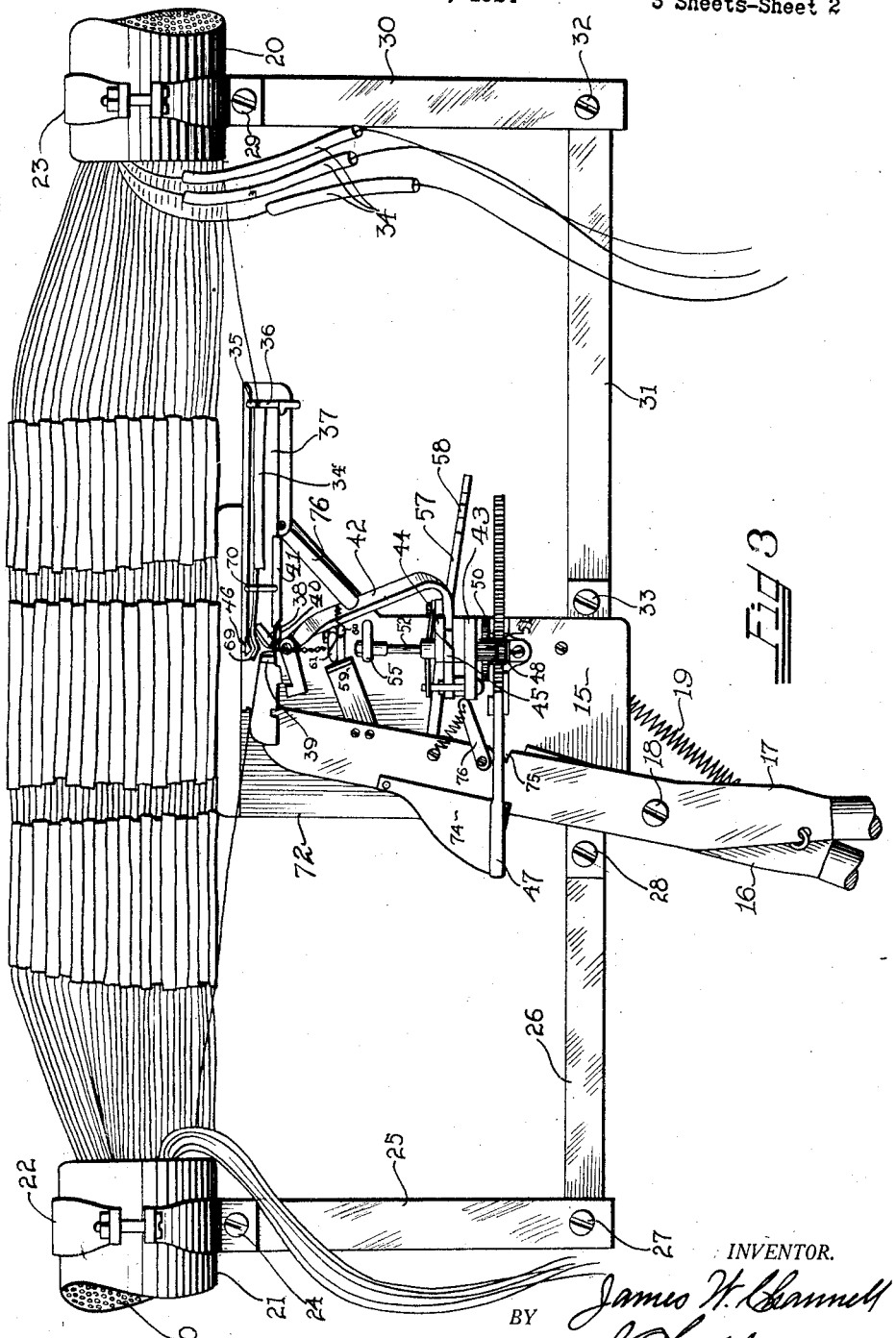

Jan. 3, 1928.
J. W. CHANNELL
1,654,788
WIRE SPLICING MACHINE
Filed Jan. 4, 1924
3 Sheets-Sheet 3
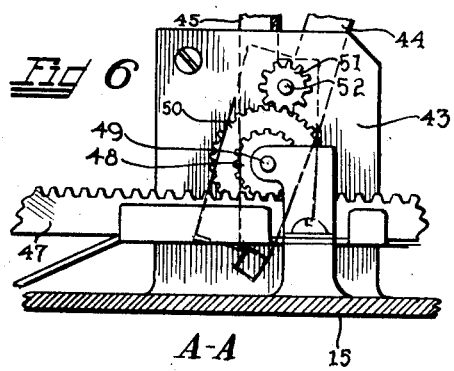
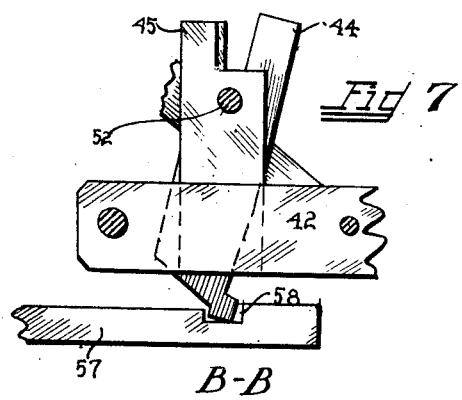
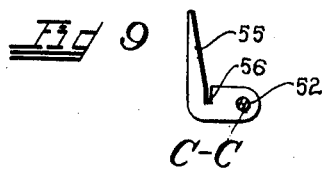
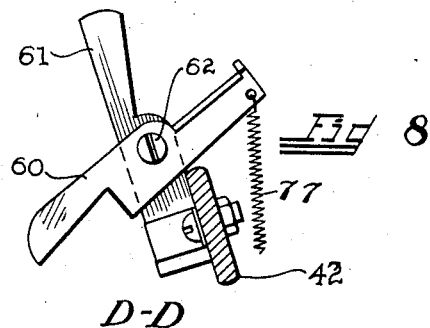
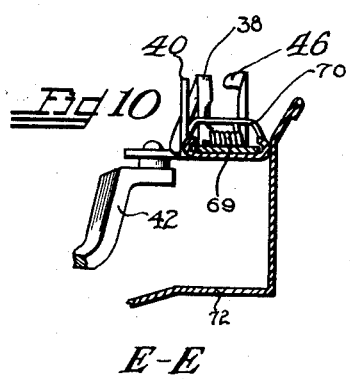
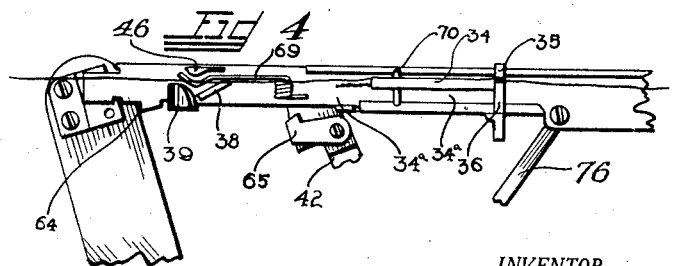
INVENTOR.
James W. Channell
BY
ATTORNEY.

Patented Jan. 3, 1928.

1,654,788

UNITED STATES PATENT OFFICE.

JAMES W. CHANNELL, OF SOUTHGATE, CALIFORNIA.

WIRE-SPLICING MACHINE.

Application filed January 4, 1924. Serial No. 684,314.

My invention relates to a machine for splicing wires of a telephone or telegraph cable or other like structures, and the object thereof is to produce a machine that will twist two wires together and place an insulating sleeve over the twisted portion, and will be described as used in splicing telephone cable wires.

In the drawings forming a part of this application:

Fig. 1 is a top plan of the machine with two wires positioned for splicing;

Fig. 2 is an end view of the machine as shown in Fig. 1;

Fig. 3 is a top plan showing a cable with the wires partly spliced and the machine connected thereto and in the position it assumes after two wires have been partly spliced;

Fig. 4 is a detail showing a portion of the splicing operation;

Fig. 5 is a view on the line 5—5 of Fig. 1; and

Figs. 6 to 10 are enlarged views of certain parts of the machine.

Referring to the drawings, 15 is the base plate of my machine, on which is mounted grip-bar 16. By making the base plate a little larger, bar 16 could be dispensed with, but I prefer its use as sometimes the operating lever 17 which is pivotally connected to bar 16 by bolt 18 is more easily operated by the use of said bar. A spring 19 connected to lever 17 and plate 15 normally holds lever 17 in its open position as shown in Fig. 1. Before commencing to use the machine, the ends of cable 20 are positioned in the manhole, not shown, in which the splicing operation is carried on. The lead armor 21 is removed from the ends of the cable the required distance. Clamps 22 and 23 are attached to the cable. Clamp 22 has pivotally connected thereto by bolt 24 a link bar 25 which is pivotally connected to link bar 26 by bolt 27. The other end of bar 26 is pivotally connected to plate 15 by bolt 28. Clamp 23 has pivotally connected thereto by bolt 29 a link bar 30 which is pivotally connected to link bar 31 by bolt 32. The other end of bar 31 is pivotally connected to plate 15 by bolt 33. By this connection the machine can be moved to the right or left and toward and from the cable.

Insulating sleeves 34 are placed on as many wires on one end of the cable as desired, shown as the end at the right in Fig. 3. The operator takes a wire from the right-hand end of the cable and brings the same down between the guide lugs 35 and 36, which lugs are mounted on and carried by the rear or right hand end of slide 37, thence forward or to the left and down between guide lugs 38 and 39 mounted on the front end of slide 37 and thence around a short skinning blade 40. Blade 40 is mounted on the slide guide 41 that is mounted on arm 42, which arm is connected to standard 43 mounted on plate 15. It will be understood that sleeve 34 of this wire is positioned between the pairs of guide lugs 35—36 and 38—39 carried by slide 37. He then brings the wire between the blades 44 and 45 of a shearing device and turns the wire to the right or left to position it in the shears. He then takes a companion wire from the left end of the cable and brings it around lug 39 which acts as a skinning blade and is attached to slide 37 near its front end, and normally lies near blade 40, and brings it down between blades 44 and 45 and turns it to the right or left.

In bringing the wires around these skinning blades and into the shears, the paper insulation breaks at the skinning blades and is stripped off by the operator, leaving the wires clear from the blades to the free ends thereof. After the wires are positioned in the shears the operator seizes the operating lever 17 and moves the same to cause the inner end, that is the end nearest the cable, to travel toward the right. This end of the lever carries a rack-bar 47 which meshes with a pinion 48 on shaft 49. Shaft 49 has gear 50 rigidly mounted thereon, which meshes with pinion 51 mounted on shaft 52. Shaft 52 carries a twister hook 55 which is revolved by the movement of the rack to the right. As best shown in Fig. 9 the twister hook has a body which is rigidly secured on shaft 52. From this body an arm projects angularly and a notch 56 is provided at the junction of the body and arm. When shaft 52 is revolved the arm passes around the wires and draws them firmly into the notch, after which the wires are cut on one side of the hook. The rotation of shaft 52 twists the wires together, making what is known as a pig-tail splice. Lever 17 also has connected thereto a shear operating bar 57 which has a notch 58 in the right-hand end (best shown in Fig. 7). The lower end of blade 44 projects into notch 58 and as the bar is moved to the right moves the upper end of the blade to the left and the edge thereof past the edge of blade 45, which last blade is rigidly secured to standard 43, shown in dotted lines in Fig. 6 to better illustrate the other parts. It will be observed that there is some play in notch 58 so that the revolution of hook 55 commences slightly in advance of the movement of blade 44 so as to securely position the wires in notch 56 before the blades 44 and 45 cut off the free ends of the wires. The full movement of lever 17 through the connected mechanism effects the twisting of the wires from hook 55 to the skinning blades 40 and 39. Lever 17 carries near its inner end a shear lug 59 which when moved to the right engages the lower end of shear blade 60 and thereby moves the upper end of the blade toward its companion blade 61 rigidly attached to arm 42. Blades 60 is pivotally attached to blade 61 by screw 62, as best shown in Fig. 8. It will be understood that the wires pass between these blades in their open position and that at the time lug 59 causes the closing of blades 60 and 61 that the wires are twisted or fully spliced and these blades cut off the wire held by hook 55, thereby leaving a twisted or spliced end connecting the two wires and extending to the skinning blades.

Lever 17 carries at its inner end a trigger lug 63 (best shown in Fig. 1), which on its extreme movement to the right passes just beyond a trigger 64 mounted in the front end of slide 37 to turn up toward the slide as lug 63 passes and to fall back behind the lug. Slide 37 has a notch 64 therein which is engaged by a detent 65 which holds the slide from movement to the left. Detent 65 is pivoted on bar 42 at 54 and the free end thereof projects downwardly and is engaged by detent lug 67 carried by the inner end of lever 17 when moved to the right, thereby disengaging the detent from notch 64 and permitting the slide to move to the left. A spring 66 holds the detent normally positioned. As before stated at this time, sleeve 34 of this spliced wire lies on slide 37 between lugs 35, 36 and 38, 39. After the inner end of lever 17 has moved to its extreme position to the right, the power is removed therefrom and spring 19 moves lever 17 to its open position. In moving to its open position, lug 63 engages trigger 64 and carries slide 37 to the left, thereby causing lugs 38—39 to bring the twisted ends of the wires to the left and against the wire and lugs 35—36 to cause the sleeve to be slid along and over the twisted portion and wire alongside which completes the splice. Slide 37 carries a spring wire ejector 69, the free end of which lies between lugs 38—46 and is held down by guide bar 70 attached to the slide guide. The wire with the sleeve thereon passes over bar 70 and when ejector 69 has passed beyond bar 70 the wire is thrown out of guides 38—39. At this time the insulating sleeve is properly positioned and lug 63 disengages from trigger 64 and spring 71 returns slide 37 to its position at the right and the machine is ready to splice another wire, but the wires to be spliced must be positioned as before stated. When slide 37 is returned to the right, detent 65 again engages the slide and holds it against movement to the left until released. A plate 72 may be provided to protect the parts. A bolt 73 connects plate 72 to a brace 76, which brace is attached to bar 42. One end of spring 71 is attached to bolt 73 and the other end is attached to slide 37 at its inner end. In the machine now in use I connect bar 47 to lever 17 by attaching a cam plate 74 to the left side of lever 17 and cutting a cam notch 75 in lever 17 opposite plate 74. The outer end of bar 47 hooks over plate 74 and is thinner than the other parts of the bar to the right of the lever. The thicker portion projects downwardly and is engaged by lever 17 when it moves to the right. The hooked portion engages plate 74 and retracts the bar when the lever moves to the left. Other means of connection between bar 47 and lever 17 may be used. A shock bar 76ª may be provided to prevent shocks to bar 47.

While I have described a machine as constructed and operated by me, it is obvious that the various parts, such as the operating lever, the guide for the slide, and the cutting blades, could be mounted upon the base plate. Other means than rack bar 47 may be used for operating the gears. A bolt 77 connects bar 42 with plate 72.

Having described my invention, I claim:

1. A splicing machine for splicing the wires of telephone cables and other like cable wires in which the armor and insulation at and near the ends to be spliced have been removed and insulating sleeves threaded upon the wires, a base plate; a slide guide mounted thereon; a slide mounted in said guide; guide lugs and a trigger carried by said slide; a spring to retract said slide; a detent to hold said slide against accidental movement; a standard mounted on said base plate; a train of gears mounted on said standard; a shaft revolubly mounted in said standard and having mounted thereon one of the gears of said train; a twister hook mounted on said shaft, said hook having a wire notch therein; shears mounted on both sides of said hook; an operating lever mounted on said base plate; means attached to said lever to actuate said train of gears and to operate said shears, slide, and detent; and a spring mounted to return the operating lever to its open position after the gears have caused the hook to twist the wires.

2. In a machine for splicing pairs of cable wires, in combination: a base plate, a shaft revolubly mounted thereon, a twister hook having a body rigidly secured on said shaft, and an arm projecting angularly from the body to form a notch at the junction of the arm and body, in which notch the two wires are automatically forced when the shaft is revolved; with an operating lever connected to said shaft and adapted to revolve said shaft when said lever is reciprocated.

3. In a machine for splicing cable wires, a base plate, an operating lever mounted on said plate, a slide guide mounted on said plate, a slide mounted in said guide, means mounted on said plate adapted to twist together the ends of two wires; and coacting means, a part carried by the lever and the other part carried by the slide adapted to move a sleeve over the twisted portions of the wires, said sleeve having been previously placed by hand upon one of the wires.

4. In a machine for splicing cable wires, a base plate, means mounted on said plate adapted to hold two wires thereon while being spliced, means mounted on said plate adapted to twist the ends of two wires together, means mounted on said plate adapted to cut off the surplus portion of the twisted wires; and means mounted on said plate adapted to move a sleeve over the twisted portion of the wires, said sleeve having been previously placed on one of the wires in the sleeve sliding means by hand.

5. In a device of the character described, a shaft, a body mounted on said shaft, said body having an arm projecting angularly from said body at an angle to the length of said shaft and forming with the body a notch at its junction therewith; in combination with means to revolve said shaft, whereby the revolution of the shaft will cause the arm to catch the wires and draw them into and hold them in the notch and twist them together as the body and arm revolve with the shaft.

6. In a device of the character described, holding means, means to hold the outer ends of two wires positioned in said holding means, means to twist together the ends of said wires, and means to sever the outer ends of the wires from the holding means at the beginning of the action of the twisting means.

7. In a device of the character described, means to hold a plurality of wires of which one or more are provided with a sleeve, other means to twist the ends of the wires together, means to sever the outer ends of said wires from the holding means, and means to slide the sleeve over the unsevered twisted portion of the wires.

8. In a device of the character described, means to twist the ends of two wires together, said wires forming a part of a cable; in combination with means to hold the twisting means on the cable while the wires are being twisted, said holding means having one part connected to one end of the cable to be spliced and another part connected to the other end of the cable to be spliced and being slidably engaged by the twisting means.

In witness that I claim the foregoing I have hereunto subscribed my name this 22nd day of December, 1923.

JAMES W. CHANNELL.